United States Patent
Yamayose

(10) Patent No.: US 9,321,189 B1
(45) Date of Patent: Apr. 26, 2016

(54) METHOD FOR MANUFACTURING CERAMIC HONEYCOMB STRUCTURE

(71) Applicant: Ibiden Co., Ltd., Ogaki-shi (JP)

(72) Inventor: Kazunori Yamayose, Stuttgart (DE)

(73) Assignee: IBIDEN CO., LTD., Ogaki-shi (JP)

( * ) Notice: Subject to any disclaimer, the term of this patent is extended or adjusted under 35 U.S.C. 154(b) by 228 days.

(21) Appl. No.: 13/873,933

(22) Filed: Apr. 30, 2013

Related U.S. Application Data

(60) Provisional application No. 61/787,627, filed on Mar. 15, 2013.

(51) Int. Cl.
*B28B 21/92* (2006.01)

(52) U.S. Cl.
CPC ..................... *B28B 21/92* (2013.01)

(58) Field of Classification Search
CPC .. C04B 35/10; C04B 35/478; C04B 38/0006; B28B 3/20; B28B 2003/203
USPC ................................................. 264/630, 631
See application file for complete search history.

(56) References Cited

U.S. PATENT DOCUMENTS

| | | | | |
|---|---|---|---|---|
| 5,725,829 | A * | 3/1998 | Miyahara et al. | 264/630 |
| 6,027,684 | A * | 2/2000 | Gheorghiu et al. | 264/631 |
| 7,567,817 | B2 * | 7/2009 | Liu et al. | 455/523 |
| 7,854,881 | B2 * | 12/2010 | Liu | 264/630 |
| 7,976,768 | B2 * | 7/2011 | Brady et al. | 264/630 |
| 2003/0021948 | A1 * | 1/2003 | Ichikawa et al. | 428/116 |
| 2005/0253311 | A1 * | 11/2005 | Nakamura et al. | 264/630 |
| 2006/0119016 | A1 * | 6/2006 | Shinohara et al. | 264/630 |
| 2008/0286179 | A1 * | 11/2008 | Liu et al. | 422/310 |
| 2013/0241120 | A1 * | 9/2013 | Yamanishi et al. | 264/630 |

FOREIGN PATENT DOCUMENTS

| | | |
|---|---|---|
| JP | 2002-020173 | 1/2002 |
| JP | 2002-020174 | 1/2002 |
| JP | 2007-001843 | 1/2007 |

OTHER PUBLICATIONS

U.S. Appl. No. 13/887,638, filed May 6, 2013, Yamayose.
U.S. Appl. No. 13/872,483, filed Apr. 29, 2013, Yamayose.
U.S. Appl. No. 13/873,576, filed Apr. 30, 2013, Yamayose.
U.S. Appl. No. 13/873,379, filed Apr. 30, 2013, Yamayose.

(Continued)

*Primary Examiner* — Russell Kemmerle, III
(74) *Attorney, Agent, or Firm* — Oblon, McClelland, Maier & Neustadt, L.L.P.

(57) ABSTRACT

A method for manufacturing a ceramic honeycomb structure includes kneading inorganic particles and binder ingredient such that raw material paste including the inorganic particles and binder ingredient is prepared, forming a body made of the raw material paste and having a honeycomb structure such that the body has the honeycomb structure having multiple through-holes extending in the longitudinal direction of the body and multiple partitions formed between the through-holes, degreasing of the body including heating the body in atmosphere maintaining oxygen concentration of 0.2% or less in the first heating and heating the body in atmosphere having oxygen concentration which is higher than the oxygen concentration of the first heating in the second heating such that a degreased body having the honeycomb structure is formed, and sintering the degreased body having the honeycomb structure such that a ceramic body having the honeycomb structure is formed.

19 Claims, 7 Drawing Sheets

(56) References Cited

OTHER PUBLICATIONS

U.S. Appl. No. 13/887,688, filed May 6, 2013, Yamayose.
U.S. Appl. No. 13/873,624, filed Apr. 30, 2013, Yamayose.
U.S. Appl. No. 13/873,933, filed Apr. 30, 2013, Yamayose.

* cited by examiner

Cross-sectional view at line (A-A)

METHOD FOR MANUFACTURING CERAMIC HONEYCOMB STRUCTURE

CROSS-REFERENCE TO RELATED APPLICATIONS

The present application is based upon and claims the benefit of priority from U.S. Application No. 61/787,627, filed Mar. 15, 2013, the entire contents of which are incorporated herein by reference.

BACKGROUND OF THE INVENTION

1. Field of the Invention

The present invention relates to a method for manufacturing a ceramic honeycomb structural body. More specifically, the present invention relates to a degreasing method for removing organic ingredients from a body formed by shaping the raw material paste.

2. Description of Background Art

Japanese Laid-Open Patent Publication No. 2002-020173 describes a method for degreasing a silicon-carbide body in an atmosphere with an oxygen concentration of 1%~20% to heat the silicon-carbide body to such a temperature that its binder ingredient decomposes. Japanese Laid-Open Patent Publication No. 2002-020174 describes a continuous degreasing furnace equipped with a muffler, transport mechanism, heating mechanism, gas-introduction mechanism, gas-exhaust mechanism and the like. Japanese Laid-Open Patent Publication No. 2007-001843 describes a degreasing method such as follows: in a temperature range at which combustible gas is generated by thermally decomposing organic matter, an explosion of combustible gas inside a degreasing furnace or exhaust systems (exhaust damper, exhaust duct) is prevented by setting the oxygen concentration in a degreasing furnace (oxygen concentration in the furnace) at or below a predetermined level, while thermal loss by exhaust gas discharged through exhaust systems (exhaust damper, exhaust duct) is reduced by controlling the combustible gas concentration in a degreasing furnace (combustible gas concentration in the furnace) within a predetermined level. The entire contents of these publications are incorporated herein by reference.

SUMMARY OF THE INVENTION

According to one aspect of the present invention, a method for manufacturing a ceramic honeycomb structure includes kneading inorganic particles and a binder ingredient such that a raw material paste including the inorganic particles and the binder ingredient is prepared, forming a body made of the raw material paste and having a honeycomb structure such that the body has the honeycomb structure having multiple through-holes extending in the longitudinal direction of the body and multiple partitions formed between the through-holes, degreasing the body including heating the body made of the raw material paste in an atmosphere maintaining an oxygen concentration of 0.2% or less in the first heating and heating the body made of the raw material paste in an atmosphere having an oxygen concentration which is higher than the oxygen concentration of the first heating in the second heating such that a degreased body having the honeycomb structure is formed, and sintering the degreased body having the honeycomb structure such that a ceramic body having the honeycomb structure is formed.

Another aspect of the present invention is a ceramic honeycomb structural body produced by a method for manufacturing a ceramic honeycomb structure including kneading inorganic particles and a binder ingredient such that a raw material paste including the inorganic particles and the binder ingredient is prepared, forming a body made of the raw material paste and having a honeycomb structure such that the body has the honeycomb structure having multiple through-holes extending in the longitudinal direction of the body and multiple partitions formed between the through-holes, degreasing the body including heating the body made of the raw material paste in an atmosphere maintaining an oxygen concentration of 0.2% or less in the first heating and heating the body made of the raw material paste in an atmosphere having an oxygen concentration which is higher than the oxygen concentration of the first heating in the second heating such that a degreased body having the honeycomb structure is formed, and sintering the degreased body having the honeycomb structure such that a ceramic body having the honeycomb structure is formed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
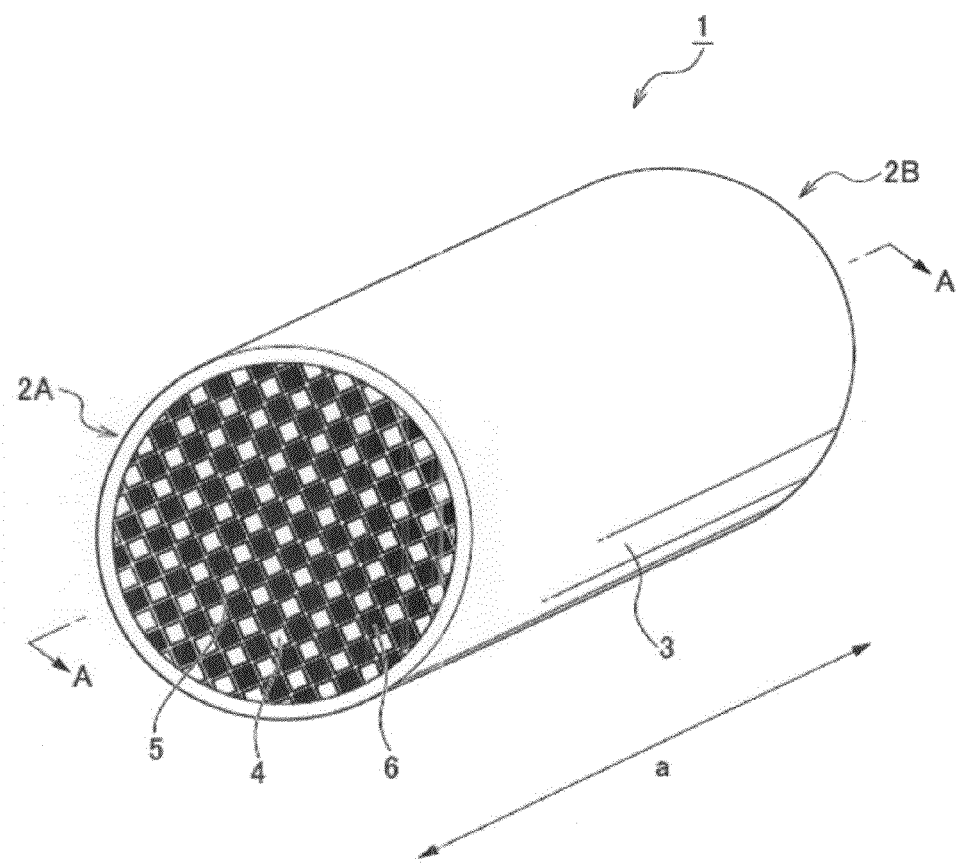
FIG. 1 is a perspective view schematically showing an example of a ceramic honeycomb structural body obtained by a manufacturing method according to an embodiment of the present invention.

The embodiments will now be described with reference to the accompanying drawings, wherein like reference numerals designate corresponding or identical elements throughout the various drawings.

FIG. 1 is a perspective view schematically showing an example of a ceramic honeycomb structural body obtained by a manufacturing method according to an embodiment of the present invention.

As shown in FIG. 1, a ceramic honeycomb structure according to an embodiment of the present invention is made of aluminum-titanate-based ceramic body 1 (aluminum-titanate-based sintered body), for example. Ceramic body 1 has two open end surfaces (2A, 2B) and side surface 3. Also, ceramic body 1 has multiple cells made of through-holes 4 and partitions 5 which section off through-holes 4. Through-holes 4 extend from end surface (2A) to end surface (2B) along a longitudinal direction of ceramic body 1 (direction along arrow (a) in FIG. 1), and through-holes 4 are sectioned off by partitions 5. In addition, either end of a through-hole 4 in longitudinal direction (a) is sealed by sealant 6, while the other end is left open. Thus, through-hole 4 is sealed by sealant 6 only at either end. As shown in FIG. 1, end surfaces (2A, 2B) of ceramic body 1 are in a checkered pattern where predetermined portions are alternately sealed. However, end surfaces (2A, 2B) of ceramic body 1 are not limited to such a pattern and may be in any other sealing pattern. A sealant is not limited to any specific type, but raw material paste made of titania particles and alumina particles or of other ceramics, for example, may be used.

The shape of ceramic body 1 may also be an elliptic cylinder, a rectangular prism or a polygonal prism instead of a circular cylinder as shown in FIG. 1.

Figure 2:
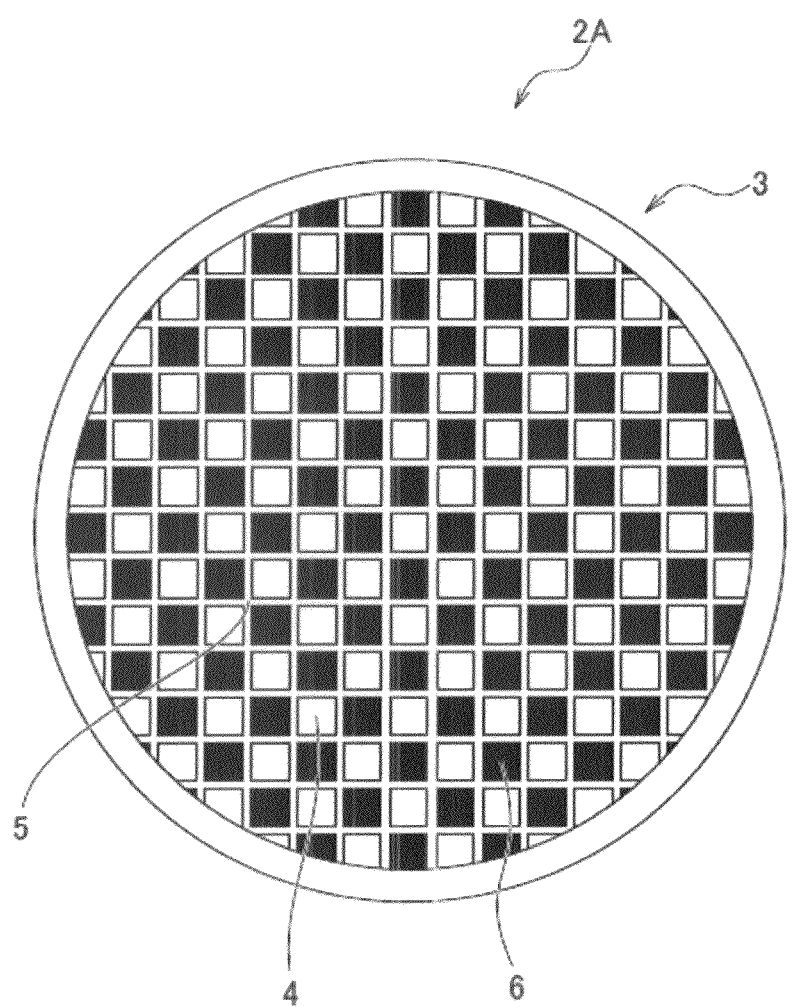
FIG. 2 is a view showing an end surface of the ceramic honeycomb structural body shown in FIG. 1.

FIG. 2 is a view showing an end surface of ceramic honeycomb structural body 1 shown in FIG. 1.

Through-holes 4 are sectioned off by partitions 5 at end surface (2A) of ceramic body 1 as shown in FIG. 2. Also, some end portions of through-holes 4 are sealed by sealant 6 while others are not sealed by sealant 6 and remain open as shown in FIG. 2. Namely, through-hole 4 is sealed by sealant 6 only at either end. Every alternate predetermined portion at end surface (2A) of ceramic body 1 is sealed so as to form a checkered pattern.

Figure 3:
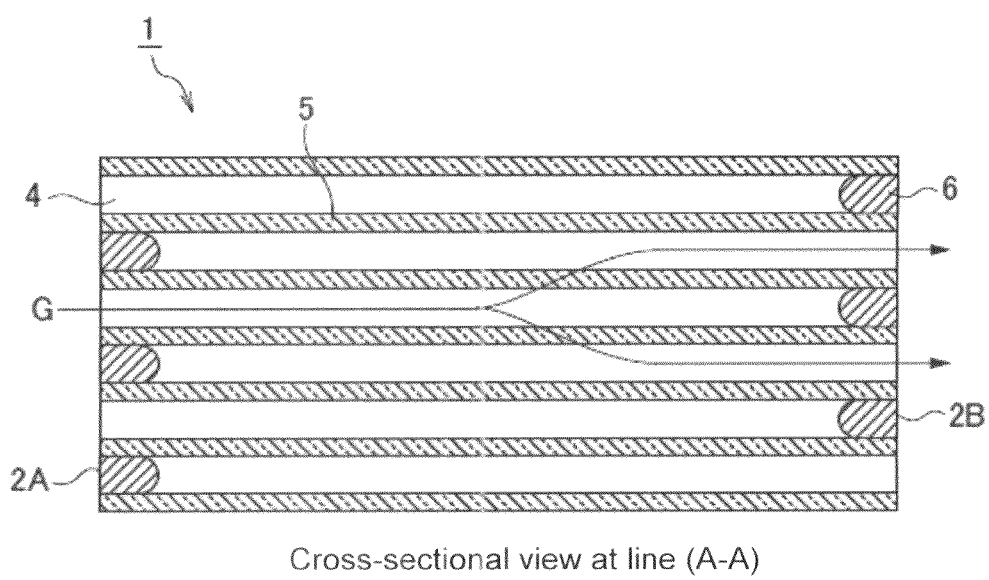
FIG. 3 is a cross-sectional view at line (A-A) of the ceramic honeycomb structural body shown in FIG. 1.

FIG. 3 is a cross-sectional view at line (A-A) of the ceramic honeycomb structural body shown in FIG. 1.

As shown in FIG. 3, one end surface (2A) is positioned on the inflow side, and exhaust gas (G) (exhaust gas from a diesel engine, for example) flows into open through-holes 4, passes through partitions 5 which section off through-holes 4, and flows out from other through-holes 4 that are open at the other end surface (2B) on the outflow side. Therefore, in ceramic honeycomb structural body 1 according to an embodiment of the present invention, partitions 5 can function as a filter to capture particulate matter (PM) or the like, for example, as a diesel particulate filter (DPF).

Next, a method for manufacturing a ceramic honeycomb structure is described in detail according to an embodiment of the present invention.

Figure 4:
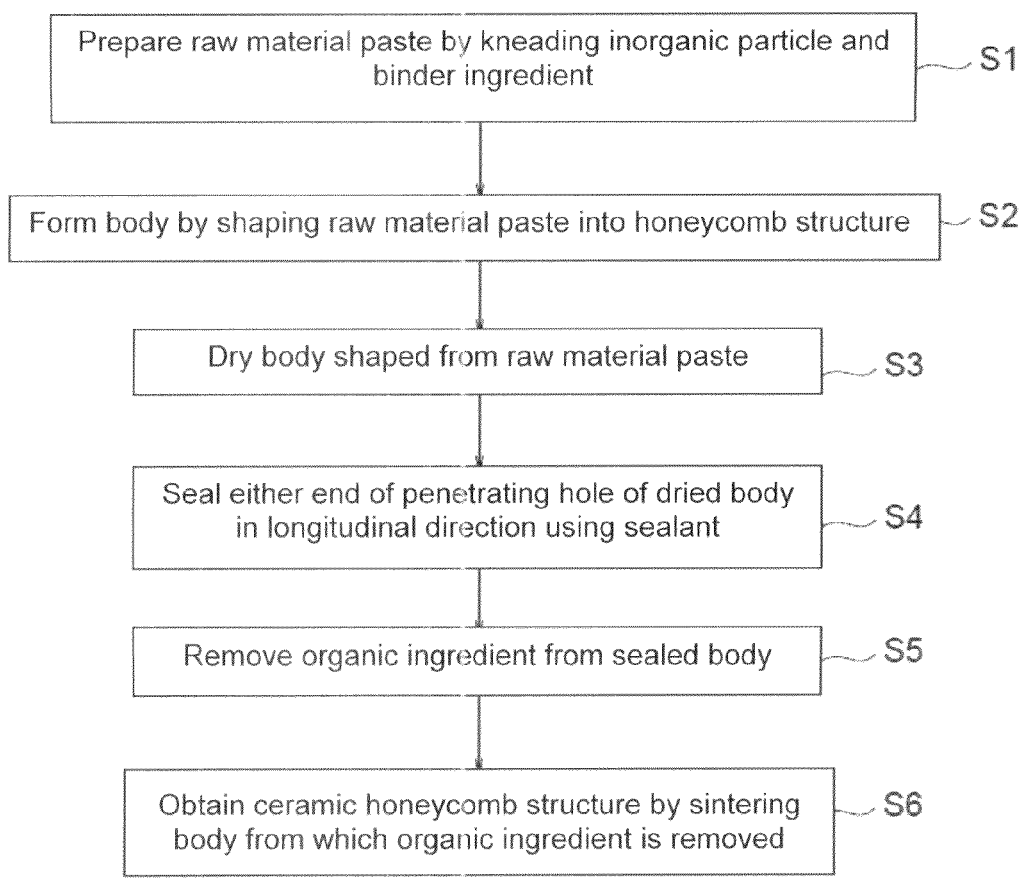
FIG. 4 is a flowchart showing an example of the manufacturing method according to an embodiment of the present invention.

FIG. 4 is a flowchart showing an example of the method for manufacturing a honeycomb structure according to an embodiment of the present invention.

As shown in FIG. 4, following is an example of the method for manufacturing a ceramic honeycomb structure according to an embodiment of the present invention: preparation step (S1) for preparing raw material paste by kneading inorganic particles and a binder ingredient; forming step (S2) for forming a body by shaping the raw material paste into a honeycomb structure; drying step (S3) for drying a body shaped from the raw material paste; sealing step (S4) for sealing either end of a through-hole of a dried body in a longitudinal direction; degreasing step (S5) for removing organic ingredients from a sealed body; sintering step (S6) to obtain a ceramic honeycomb structure by sintering a body from which organic ingredients are removed.

However, it is an option to skip drying step (S3) and sealing step (S4) in the method for manufacturing a ceramic honeycomb structure. Namely, in the method for manufacturing a ceramic honeycomb structure, it is an option to conduct preparation step (S1) for preparing raw material paste by kneading inorganic particles and a binder ingredient, and forming step (S2) for forming a body by shaping the raw material paste into a honeycomb structure, then directly afterward, to conduct degreasing step (S5) for degreasing a body shaped from the raw material paste, and to conduct sintering step (S6) to obtain a ceramic honeycomb structure by sintering a body from which organic ingredients are removed.

Sealing step (S4) may be conducted either after forming step (S2) or after sintering step (S6).

In the following, each step is described.

Preparation of Raw Material Paste (S1)

In a preparation step, raw material paste is prepared by kneading inorganic material (aggregate particles) and a binder ingredient.

A method for kneading inorganic material and a binder ingredient is not limited specifically, and a mixer, a kneader, a media mixing mill (attritor), a pressure kneader (muller) or the like may be used.

As for inorganic particles, silicon carbide particles, titania particles, alumina particles, mullite particles and the like are listed. Among those, it is preferred to use at least one type selected from a group of silicon carbide particles, titania particles and alumina particles. It is more preferred to use silicon carbide particles, or alumina particles and titania particles. It is also preferred to use mullite particles in addition to titania particles and alumina particles. In the present application, titania particles indicate those containing only titania, and alumina particles indicate those containing only alumina. Mullite particles mean particles formed with alumina components and silicon dioxide components. Here, titania particles, alumina particles and mullite particles may also contain impurities. As for impurities, for example, silicon (Si), aluminum (Al), iron (Fe), calcium (Ca), magnesium (Mg), potassium (K), sodium (Na) and the like are listed.

It is an option to use inorganic particles as is or inorganic particles slurried by using a dispersion medium such as water. When alumina particles and titania particles are used, later-described mixed particles of titania particles and alumina particles may also be used.

Provided below is a description of an example that mainly uses silicon carbide particles as inorganic particles.

Silicon carbide particles used in a preparation step are not limited to any specific type, and either α-silicon carbide particles or n-silicon carbide particles, or a combination thereof, may be used.

The particle diameter of silicon carbide particles is not limited specifically, but the mean volume particle diameter is preferably 10 μm~100 μm, more preferably 10 μm~60 μm, and even more preferably 20 μm~50 μm.

Here, mean volume particle diameters are measured using a laser diffraction particle size distribution analyzer (Beckman Coulter Inc.). In the present application, other inorganic particles are also measured using a laser diffraction particle size distribution analyzer (Beckman Coulter Inc.).

In the following, a description is provided of an example that uses mainly titania particles and alumina particles as inorganic particles.

As for titania particles and alumina particles used in the preparation step, it is an option to use a precursor in which titania particles and alumina particles are combined at an amount-of-substance ratio of titania to alumina in a range of 40:60~60:40, for example. It is also preferable to combine titania particles and alumina particles in a precursor at an amount-of-substance ratio of titania to alumina in a range of 45:55~55:45, for example. An amount-of-substance ratio here means a ratio of the amount of substance of titania to the amount of substance of alumina, not an amount-of-substance ratio of titania particles to alumina particles. Therefore, when mullite particles or the like are used when forming a precursor, an amount-of-substance ratio of titania to alumina is obtained based on the sum of alumina (amount of substance of alumina) derived from alumina particles and alumina derived from mullite particles. Accordingly, when mullite particles are used in the preparation step, it is preferred to combine mullite particles with titania particles and alumina particles in an amount-of-substance ratio of titania to alumina that is within the above range.

When titania particles and alumina particles are combined in a preparation step or a preconditioning treatment step, their weight ratio is, for example, in a range of 35:65~55:45, preferably, 40:60~50:50. The amount of unreacted titania or alumina remaining after sintering is reduced if combined within such a ratio.

Particle diameters of titania particles and alumina particles are not limited specifically. For example, when particle diameters of titania particles and alumina particles are compared, it is an option to employ any of the following: the diameter of titania particles is greater than that of alumina particles; the diameter of titania particles is smaller than that of alumina particles; or the diameter of titania particles is substantially the same as that of alumina particles.

When alumina particles are used with titania particles having a particle diameter greater than that of alumina particles, it may be referred to as a "first mode" in the following. In addition, when alumina particles are used with titania particles having a particle diameter smaller than that of alumina particles, it is referred to as a "second mode" and described below. Moreover, when alumina particles are used with titania particles having a particle diameter substantially the same as that of alumina particles, it is referred to as a "third mode" and described below.

As for the particle diameter of titania particles in the first mode, the mean volume particle diameter is 5 μm~20 μm, for example. Also, particles with a mean volume particle diameter of 8 μm~18 μm or the like may be used. Here, it is an option to use primary particles of titania particles, secondary particles that are aggregate primary particles, or a combination thereof.

In the present application, mean volume particle diameters are measured using a laser diffraction particle size distribution analyzer (Beckman Coulter Inc.).

As for the particle diameter of alumina particles in the first mode, the mean volume particle diameter is 2 μm~5 μm, for example.

In the present application, the type of alumina particles is not limited specifically. For example, α-alumina particles, γ-alumina particles, a combination of α-alumina particles and γ-alumina particles, or the like may be used. In addition, alumina particles may be primary particles, secondary particles that are aggregate primary particles, or a combination thereof.

In the first mode, the ratio of particle diameters of titania particles and alumina particles is not limited specifically, and it may be in a range of 10:1~10:3, for example.

A second mode is described in the following, using alumina particles and titania particles having a smaller particle diameter than alumina particles.

As for the particle diameter of titania particles in the second mode, the mean volume particle diameter is 0.1 μm~0.8 μm or 0.2 μm~0.5 μm, for example.

As for the particle diameter of alumina particles in the second mode, the mean volume particle diameter is 2 μm~5 μm, for example.

In the second mode, the ratio of particle diameters of titania particles and alumina particles is not limited specifically, and it may be in a range of 1:41:10, for example.

Furthermore, a third mode is described, using titania particles and alumina particles having substantially the same particle diameters as each other.

As for the particle diameter of titania particles in the third mode, the mean volume particle diameter is 1 μm~5 μm or 1 μm~3 μm, for example.

As for the particle diameter of alumina particles in the third mode, the mean volume particle diameter is 2 μm~5 μm, for example.

In the third mode, the ratio of particle diameters of titania particles to alumina particles is not limited specifically, and it may be in a range of 1.0:0.3~1:4, for example.

As for the particle diameter of mullite particles to be used in addition to titania particles and alumina particles when needed, the mean volume particle diameter is 0.1 μm~45 μm, for example. Alternatively, a mean volume particle diameter of 0.1 μm~20 μm, 0.5 μm~10 μm and so forth, for example, may also be used. When a body is sintered and aluminum titanate is formed, unreacted aluminum and silicon contained in mullite particles are thought to melt and work as a binder which fills spaces in aluminum titanate.

The mullite particles may be primary particles, secondary particles which are aggregate primary particles, or a combination thereof.

In the present embodiment, the powder of titania particles (titania powder) containing titania particles for forming a precursor may include impurities such as silicon (Si), aluminum (Al), iron (Fe), calcium (Ca), magnesium (Mg), potassium (K) and sodium (Na). In the present application, "titania particle powder" means bulk (material, raw material) of titania particles to be used in a method for manufacturing a ceramic honeycomb structure. Here, impurities in titania powder may be such that are contained inevitably during a process of manufacturing titania, or may be such that are mixed into titania powder separately. In addition to impurities that make solid solutions with titania particles, other impurities that are present outside titania particles of titania powder may also be included.

It is thought that those impurities contribute to suppressing the decomposition of aluminum titanate, which is made from titania particles and alumina particles, into titania and alumina in a high temperature range, or to improving the mechanical strength of aluminum titanate.

The amount of impurities is adjusted by controlling the amount of impurities contained in raw titania material such as $Ti(OH)_4$ (titania powder) or the like or by cleansing synthesized titania by using acids, alkalis or the like.

The amount of iron in titania powder is preferred to be at a weight ratio of 200 ppm-1000 ppm in the titania powder in terms of $Fe_2O_3$. When the amount of iron in titania powder is in the above range, it is thought that aluminum titanate formed when part of $Al^{3+}$ is displaced by $Fe^{2+}$ is suppressed from decomposing into titania and alumina in a high temperature range.

The amount of silicon in titania powder is preferred to be 0.1 wt. %~1.0 wt. % of the titania powder in terms of $SiO_2$. When the amount of silicon in titania powder is in the above range, it is thought that aluminum titanate formed when part of $Al^{3+}$ is displaced by $Si^{4+}$ is suppressed from decomposing into titania and alumina in a high temperature range.

Magnesium is preferred not to be contained in titania powder. When contained, the amount of magnesium in titania powder is preferred to be at a weight ratio of 500 ppm or lower in the titania powder in terms of MgO. Since MgO tends to absorb water, if MgO exists at particle boundaries among aluminum titanate particles, it is thought that MgO may cause cracking due to expansion from moisture absorption. Thus, the amount of magnesium in titania powder is preferred to be within the above range. Alternatively, it is preferred that no magnesium, or substantially no magnesium (at or below the detection limit), be contained in titania powder.

The amount of potassium in titania powder is preferred to be at a weight ratio of 100 ppm~600 ppm in the titania powder in terms of $K_2O$. In addition, the amount of sodium in titania powder is preferred to be at a weight ratio of 200 ppm~1000 ppm in the titania powder in terms of $Na_2O$. It is thought that $K_2O$ and $Na_2O$ work as sintering aids for sinter bonding aluminum titanate particles to each other so as to suppress cracking at particle boundaries among aluminum titanate particles. Thus, the amounts of potassium and sodium in titania powder are preferred to be in the above ranges.

Specifically, mixed particles of titania particles and alumina particles, or mixed particles of titania particles, alumina particles and mullite particles are formed by the following preconditioning treatment step.

Preconditioning Treatment

Titania particles and alumina particles are brought into contact and adhered to each other to form a precursor (a particle contact body of titania particles and alumina particles) in a preconditioning treatment step. Accordingly, a precursor is obtained where alumina particles and titania particles are in contact with each other in a homogeneously dispersed state.

In a preconditioning treatment step, a precursor may also be formed by further adding a sintering aid and bringing it into contact with titania particles and alumina particles (particle contact body of titania particles, alumina particles and a sintering aid). As for sintering aids, mullite, zircornia, alkali feldspar, strontium feldspar and the like are listed.

In the present application, "homogenized" indicates that titania particles and alumina particles are present evenly based on the amounts of substance (at a molar ratio). It is more preferred that an amount-of-substance ratio of titania to alumina in a precursor be in a range of 40:60~60:40, for example. As described above, an amount-of-substance ratio here means a ratio of the amount of substance of titania to the amount of substance of alumina, not an amount-of-substance ratio of titania particles to alumina particles. Therefore, when mullite particles or the like are used when forming a precursor, an amount-of-substance ratio of titania to alumina is obtained based on the sum (amount of substance of alumina) of alumina derived from alumina particles and alumina derived from mullite particles.

In the above first mode, to bring titania particles and alumina particles into contact with each other, the following may be employed, for example: a method in which a mixture containing titania particles and alumina particles is spray-dried; a method in which titania particles and alumina particles are granulated through a rolling motion; a method in which an aqueous dispersion of alumina particles is formed by dispersing alumina particles in a dispersion medium such as water, and then titania particles are immersed in the aqueous dispersion of alumina particles; or a method in which a mixture of titania particles and alumina particles is slurried and then dried while being mixed.

As for a method in which a mixture containing titania particles and alumina particles is spray-dried, for example, a mixture containing titania particles and alumina particles is slurried and spray-dried so that titania particles and alumina particles are homogenized.

In addition, as for another method of spray drying, for example, a binder ingredient to be used in a later-described preparation step is further added to the mixture containing titania particles and alumina particles at 5%~10% by mass based on the entire mass of titania particles, and then the mixture is spray-dried.

As for a method in which titania particles and alumina particles are granulated through a rolling motion, for example, titania particles, alumina particles and water are placed in an oscillating granulator and then put into a rolling motion to prepare a precursor; titania particles and water are placed in an oscillating granulator and put into a rolling motion, then alumina particles are added in the oscillating granulator and put into a rolling motion so that a precursor is prepared; and so forth. In such cases, a ratio of 5~10% by mass of water based on the entire mass of titania particles is used. Moreover, it is an option to use a binder ingredient (such as methylcellulose) along with water. A ratio of 5~10% by mass of the binder ingredient based on the entire mass of titania particles may be used.

As for a method in which titania particles are immersed in an aqueous dispersion of alumina particles, for example, alumina particles are dispersed in a dispersion medium such as water to form an aqueous dispersion of alumina particles, titania particles are immersed in the aqueous dispersion of alumina particles, and then a precursor, in which titania particles and alumina particles are homogeneously in contact with each other, is lifted from the aqueous dispersion of alumina particles.

As for a method in which a mixture containing titania particles and alumina particles is slurried and then dried while being mixed, for example, titania particles and alumina particles are slurried using a volatile solvent or the like to form a homogeneous mixture, which is then dried while being mixed.

In the first mode, by conducting preconditioning treatment step, it is easier to form a precursor where multiple alumina particles make contact with the surface of a titania particle using a combination of alumina particles and titania particles whose particle diameter is greater than that of alumina particles.

In addition, to bring titania particles and alumina particles into contact with each other in the second mode above, the following may be employed, for example: a method in which a mixture containing titania particles and alumina particles is spray-dried; a method in which titania particles and alumina particles are granulated through a rolling motion; a method in which an aqueous dispersion of titania particles is formed by dispersing titania particles in a dispersion medium such as water and then alumina particles are immersed in the aqueous dispersion of titania particles; or a method in which a mixture of titania particles and alumina particles is slurried, and is dried while being mixed. As for a method for granulating titania particles and alumina particles through a rolling motion, a precursor may also be prepared when alumina particles and water are placed in an oscillating granulator, put into a rolling motion, and then titania particles are added in the oscillating granulator and put into a rolling motion.

In the second mode, by conducting preconditioning treatment step, it is easier to form a precursor where titania particles make contact with the surface of an alumina particle.

Furthermore, to bring titania particles and alumina particles into contact with each other in the third mode, the following may be employed, for example: a method in which a mixture containing titania particles and alumina particles is spray-dried; a method in which titania particles and alumina particles are granulated through a rolling motion; a method in which an aqueous dispersion of alumina particles is formed by dispersing alumina particles in a dispersion medium such as water and then titania particles are immersed in the aqueous dispersion of alumina particles; a method in which an aqueous dispersion of titania particles is formed by dispersing titania particles in a dispersion medium such as water and then alumina particles are immersed in the aqueous dispersion of titania particles; or a method in which a mixture of titania particles and alumina particles is slurried, and is dried while being mixed.

In the third mode, when a preconditioning treatment step is conducted by combining titania particles and alumina particles having substantially the same particle diameter as each other, it is easier to form a mixture of a precursor where multiple alumina particles are in contact with the surface of a titania particle, a precursor where multiple titania particles are in contact with the surface of an alumina particle, and the like.

In a preconditioning treatment step, the precursor is not sintered directly after the preconditioning treatment step. It is thought to be easier to form a precursor with a uniform particle diameter and to knead the precursor and a binder ingredient for a short duration.

By doing such a preconditioning treatment step, titania particles and alumina particles are more likely to come in contact with each other. Accordingly, precursor 7 is formed, where alumina particles 9 make contact with titania particle 8 to cover its surface, for example (FIG. 5).

Figure 5:
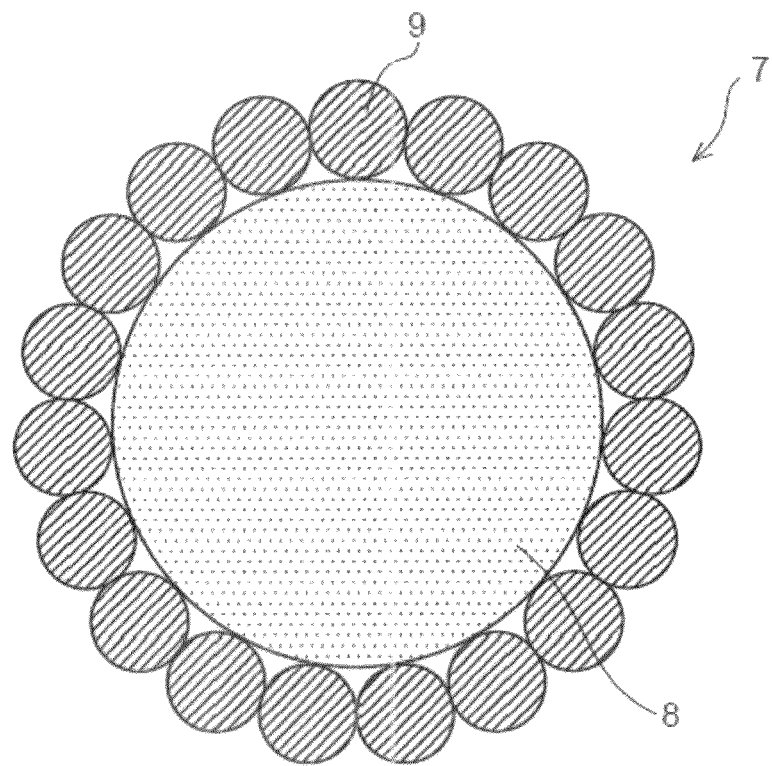
FIG. 5 is a view schematically showing an example of a precursor made of a titania particle and alumina particles according to an embodiment of the present invention.

FIG. 5 shows a state where titania particle 8 is covered with alumina particles 9. That is an example of a precursor. Here, the state of a precursor is not limited to such a size relationship between titania particles and alumina particles as shown in FIG. 5, and another state, where the size of alumina particles is greater than that of titania particles and the surface of an alumina particle is covered with titania particles, may be employed. In addition, yet another state, where the size of titania particles is substantially the same as that of alumina particles, may also be employed.

Figure 6:
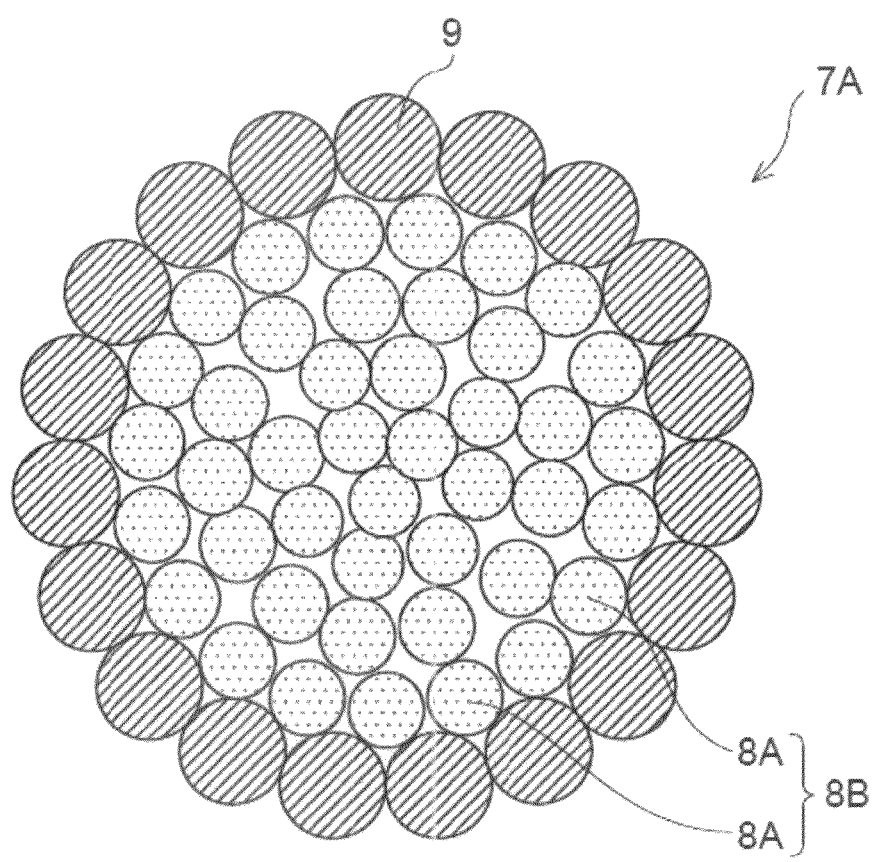
FIG. 6 is a view schematically showing another example of a precursor made of titania particles and alumina particles according to an embodiment of the present invention.

Also, when an aggregate of primary particles is used for titania particles, titania particles and alumina particles are more likely to come in contact with each other by performing a preconditioning treatment step as described above. For example, as shown in FIG. 6, a precursor (7A) is formed, where titania particles (secondary particles) (8B) made of aggregate titania particles (primary particles) (8A) are covered with alumina particles 9.

In the present application, a "precursor" means a granular substance where titania particles and alumina particles make contact and adhere to each other.

When titania particles, alumina particles and mullite particles make contact and adhere to each other, a precursor (a particle contact body of titania particles, alumina particles and mullite particles) is formed by the same method described above for bringing titania particles and alumina particles into contact with each other.

To bring titania particles, alumina particles and mullite particles into contact with each other, the following may be employed, for example: a method in which a mixture containing titania particles, alumina particles and mullite particles is spray-dried; a method in which titania particles, alumina particles and mullite particles are granulated through a rolling motion; a method in which a mixed aqueous dispersion of alumina particles and mullite particles is formed by dispersing alumina particles and mullite particles in a dispersion medium such as water, and then titania particles are immersed in the mixed aqueous dispersion; or a method in which a mixture of titania particles, alumina particles and mullite particles is slurried and then dried while being mixed.

Other inorganic particles may further be used for raw material paste. Magnesium oxide particles, silicon dioxide particles and the like are listed as other inorganic particles.

As for a binder ingredient, the following are listed: celluloses such as methylcellulose, carboxymethyl cellulose and sodium carboxymethyl cellulose; alcohols such as polyvinyl alcohol; salts such as lignosulfonate; waxes such as paraffin wax and microcrystalline wax; and thermoplastic resins such as EVA, polyethylene, polystyrene, liquid-crystal polymer and engineering plastics.

The amount of a binder ingredient to be added is 0.1%~20% by mass based on 100% by mass of a precursor, for example. It may be 1%~15% by mass, for example.

To prepare raw material paste, other ingredients may be added to a precursor and a binder ingredient.

As for other ingredients, pore-forming agents, lubricants, plasticizers, dispersing agents, solvents and the like are listed.

For pore-forming agents, the following are listed: carbon materials such as graphite; resins such as polyethylene, polypropylene and polymethylmethacrylate; plant-based materials such as starch, nut shells, walnut shells and corn; ice; dry ice; and the like.

The amount of a pore-forming agent to be added is 0.1%~30% by mass based on 100% by mass of a precursor. It may be 1%~20% by mass, for example.

For lubricants and plasticizers, the following are listed, for example: alcohols such as glycerin; higher fatty acids such as caprylic acid, lauric acid, palmitic acid, alginic acid, oleic acid and stearic acid; and metal stearate such as aluminum stearate.

The amount of a lubricant or plasticizer to be added is 0.01%~5% by mass based on 100% by mass of a precursor. It may be 0.1%~1% by mass.

As for dispersing agents, the following are listed, for example: inorganic acids such as nitric acid, hydrochloric acid and sulfuric acid; organic acids such as oxalic acid, citric acid, acetic acid, malic acid and lactic acid; alcohols such as methanol, ethanol and propanol; surfactants such as ammonium polycarboxylate and polyoxyalkylene alkyl ether; and so forth.

The amount of a dispersing agent to be added is 0.01%~10% by mass based on 100% by mass of a precursor. It may be 0.05%~2% by mass.

As for solvents, the following are listed, for example: alcohols such as methanol, ethanol, butanol and propanol; glycols such as propylene glycol, polypropylene glycol and ethylene glycol; water; and the like.

The amount of a solvent to be added is 0.1%~50% by mass. It may be 10%~40% by mass.

Forming of Honeycomb Structural Body (S2)

In a forming step, a body is formed by shaping the raw material paste into a honeycomb structure.

Forming raw material paste into a shape is not limited to any specific method, and extrusion through a honeycomb die or the like may be employed.

Drying of Body Shaped from Raw Material Paste (S3)

In a drying step, a body shaped from the raw material paste is dried.

Dryers for a drying step are not limited to any specific type, and the following are listed: microwave dryers, hot-air dryers, dielectric heating dryers, reduced-pressure dryers, vacuum dryers, freeze dryers and the like.

The duration and temperature for drying are set appropriately according to the volume or the like of a honeycomb body shaped from the raw material paste.

Sealing of Through-Holes (S4)

In a sealing step, either end of a through-hole of the dried body in a longitudinal direction is sealed using a sealant.

Application of a sealant to a honeycomb body is not limited specifically.

There are methods such as immersing an end surface of a body into sealant slurry, injecting a sealant into a through-hole from an end surface using an injector, and the like.

As for a sealant, it is not limited to any specific type. For example, raw material paste made of silicon carbide particles, or titania particles and alumina particles, or made of other ceramic, may be used.

Sealant slurry is prepared by adding a binder ingredient, water or the like to silicon carbide particles or to titania particles and alumina particles, for example. The viscosity of sealant slurry is adjusted appropriately according to the type and the like of the sealant.

Degreasing of Honeycomb Structural Body (S5)

A degreasing step is conducted to remove organic ingredients from a sealed body. Such a step includes a first step for heating a body shaped from the raw material paste in an atmosphere by maintaining its oxygen concentration at or below 0.2%, and after the first step, a second step for heating the body in an atmosphere with an oxygen concentration higher than that of the first step. By dividing a degreasing step into a first step and a second step, removal of organic ingredients is achieved in a shorter period of time than with a conventional degreasing step.

Oxygen concentration (%) means volume percentage. To adjust the oxygen concentration, an inactive gas, for example, nitrogen or argon gas, is introduced into a sintering furnace for degreasing so that the atmosphere in the furnace is displaced by an inactive gas. Next, oxygen is introduced to the sintering furnace at a volume percentage of 2% or lower. Also, the oxygen concentration in a sintering furnace is checked when necessary by measuring the concentration level using a zirconia oxygen analyzer (ZR 402, Yokogawa Electric Corporation) or the like.

First, a first step is described.

A body is heated in the first step while the oxygen concentration in the atmosphere is maintained at or below 0.2%. When a body is heated in the first step while the oxygen concentration in the atmosphere is maintained at or below 0.2%, it is thought that oxidation reactions (combustion) are suppressed and that organic ingredients are degreased mainly through thermal decomposition (organic ingredients in a body are mainly decomposed thermally). Therefore, the temperature is less likely to rise sharply in a first step where a combustion reaction is suppressed, and thus organic ingredients are thought to vaporize through thermal decomposition in a short period of time.

Also, since organic ingredients in a body are mainly decomposed thermally in a first step, such a process is thought to suppress oxidation reactions that may occur in portions of a body during a degreasing step due to organic ingredients existing unevenly in the body. Accordingly, an uneven distribution of temperature is thought to be suppressed in the body. Moreover, such a process also suppresses deformation or cracking in a sintered body that may be caused by an uneven distribution of temperature in the body during a degreasing step.

In particular, as for specific examples of organic ingredients to be degreased during a first step, acrylic particles, benzyl alcohol, oleic acid, Selosol and the like are listed.

It is sufficient if the oxygen concentration in an atmosphere is maintained at or below 0.2%. Also, theoretically, it is preferred for the oxygen concentration in an atmosphere to be zero, namely, for no oxygen to be contained. However, because of the limitations of a degreasing apparatus (degreasing furnace), it may be that 0.05% is the lowest level. The oxygen concentration in the atmosphere is preferred to be 0.05%~0.1%.

In the first step, a body is preferred to be heated until its surface temperature reaches 400° C.~600° C. When a body is heated until its surface temperature reaches 400° C.~600° C., it is thought that among the organic ingredients in the body, organic ingredients that vaporize through thermal decomposition are thought to be sufficiently degreased. It is more preferred to heat a body until its surface temperature reaches 450° C.~600° C.

In the present application, the surface temperature of a body means the temperature in the vicinity of the surface of a body. Using a thermometer provided in a degreasing furnace, such temperature is measured by a generally used method.

In addition, because of the heat of vaporization generated through vaporization reactions during thermal decomposition, the surface temperature of a body rises gradually. Thus, a body is preferred to be heated in the first step by a programmed rate of temperature rise on the surface of a body at 0.1° C./h~20° C./h. In addition, it is more preferable to set the programmed rate of temperature rise on the surface of a body at 0.1° C./h~10° C./h, and even more preferable at 1° C./h~10° C./h.

In a first step, it is preferred to heat a degreasing furnace so that the surface temperature of a body will be 400° C.~600° C. at a programmed rate of temperature rise on the surface of a body at 10° C./h~20° C./h.

Next, a second step is described below.

A second step is conducted after a first step, and a body is heated in an atmosphere with a higher oxygen concentration than that in the first step. By heating a body after the first step in an atmosphere with a higher oxygen concentration than that in the first step, it is thought that organic ingredients are degreased mainly through oxidation (organic ingredients in a body are mainly oxidized). Accordingly, it is thought that organic ingredients remaining after the first step are completely removed in a second step.

As for specific examples of organic ingredients to be removed in a second step, methylcellulose and the like are listed. Some of such organic ingredients are also vaporized during a first step, but they will be completely removed by conducting a second step.

In a second step, since organic ingredients have been removed in advance through thermal decomposition in a first step, it is thought that a sharp temperature rise is suppressed even when oxidation reactions occur in the second step, and that temperature is easier to control. Besides, since oxidation reactions in some portions are also suppressed, uneven distribution of temperature in a body is thought to be suppressed.

Moreover, since some organic ingredients in a body have already been removed in a first step, the remaining organic ingredients are removed in a second step after the first step. Thus, it is thought that a degreasing treatment is conducted in a shorter period of time. Accordingly, it is thought that no excess load will be exerted on a body during a degreasing step.

In a second step, a body is preferred to be heated while the surface temperature of the body is maintained at 400° C.~600° C. In heating a body by maintaining its surface temperature at 400° C.~600° C., it is thought that no excess load is exerted on the body and that deformation or cracking is less likely to occur after a sintering step. The surface temperature of a body is preferred to be maintained at 450° C.~600° C. Maintaining the surface temperature of a body at 400° C.~600° C. is not limited to any specific method, and intermittent heating methods or the like may be used.

In a second step, it is preferred to increase the oxygen concentration in a degreasing furnace so as to reach a desired concentration in 0.1~50 hours. By so setting, a sharp temperature rise is prevented during the second step. Also, it is more preferable to reach a desired concentration in 0.5~40 hours or in 0.5~10 hours.

In a second step, a desired oxygen concentration in a degreasing furnace is 1%~5%, for example. It is preferred to be 1%~3%, more preferably approximately 2%.

In a second step, it is preferred to heat a body until oxidation reactions are completed. In doing so, it is thought that a sufficient degreasing treatment is conducted on organic ingredients in the body.

Other conditions such as duration or the like for a first step and a second step are not limited specifically, and may be selected appropriately according to the type and amount of organic ingredients in a honeycomb body.

In addition, a first step and a second step may be conducted consecutively or separately. For example, it is an option to conduct a cooling step or a step to replace atmosphere or the like after a first step, and then to conduct a second step.

Sintering of Honeycomb Structural Body (S6)

In a sintering step, a ceramic honeycomb structure is obtained by sintering a body from which organic ingredients have been removed.

Sintering is not limited to any specific method, and is conducted using a sintering furnace such as an electric tube furnace, electric box furnace, tunnel kiln, far infrared furnace, microwave heater, shaft kiln, reverberatory furnace, rotary-hearth furnace or roller-hearth furnace.

As for sintering methods, a body may be sintered batch by batch or continuously. Alternatively, a body may be settled or circulated while being sintered.

The sintering temperature is 1350° C. or higher, for example, and it may be set at 1400° C. or higher. In addition, the sintering temperature is 1650° C. or lower, for example, and it may be set at 1550° C. or lower.

The programmed rate of the sintering temperature is not limited specifically, and it may be set at 1° C./hour~500° C./hour, for example.

A honeycomb body may be sintered in an inactive gas such as atmospheric air, nitrogen gas or argon gas. Also, it may be sintered in a reducing gas such as carbon monoxide gas or hydrogen gas. When alumina particles and titania particles are used in raw material, an oxygen atmosphere such as atmospheric air is preferred. When silicon carbide particles are used, an inactive gas such as argon gas is preferred.

The duration for sintering a honeycomb body differs depending on the amount of raw material paste, the type of sintering furnace, the sintering temperature, the sintering atmosphere and the like. It may be set for 10 minutes to 24 hours, for example.

Ceramic Honeycomb Structural Body

A ceramic honeycomb structure according to an embodiment of the present invention is obtained by a method for manufacturing a ceramic honeycomb structure that includes the following: a preparation step for preparing raw material paste by kneading inorganic particles and a binder ingredient; a forming step to form a body having through-holes and partitions by shaping the raw material paste into a honeycomb structure; a degreasing step including a first step for heating a body shaped from the raw material paste in an atmosphere by maintaining its oxygen concentration at or below 0.2%, and after the first step, a second step for heating the body by increasing the oxygen concentration; and a sintering step for sintering a degreased body to obtain a ceramic honeycomb structure.

Partitions of a ceramic honeycomb structural body can function as a filter to capture particulate matter (PM) or the like.

Therefore, a ceramic honeycomb structure can function, for example, as a diesel particulate filter (DPF) or the like.

An element analysis is performed on the obtained ceramic body using a scanning electron microscope (S-4800, Hitachi, Ltd.) and an energy dispersive X-ray spectrometer (EMAX Energy EX-250, Horiba, Ltd.).

EXAMPLES

The present invention is further described in detail by the following examples. However, the present invention is not limited to such examples.

Example 1

Eight parts by weight of titania particles with a mean volume particle diameter of 12 μm (brand name $TiO_2$ 3020 (registered trademark), Kronos Incorporated), 10 parts by weight of alumina particles with a mean volume particle diameter of 3 μm (brand name $Al_2O_3$ RMA (registered trademark), Alcan Inc.), and 40 parts by weight of water are placed into a spray dryer (G8210-A, Yamato Scientific Co., Ltd.) and spray dried to form a precursor.

The precursor, 6 parts by weight of alumina particles, 3 parts by weight of silicon dioxide, 20 parts by weight of pore-forming graphite (brand name A625, Asbury Graphite Mills, Inc.) and 4.5 parts by weight of methyl cellulose (brand name METOLOSE 60SH, Shin-Etsu Chemical Co., Ltd.) are placed into a kneader (brand name Mix Muller, Shinto Kogyo K.K.) and kneaded to prepare raw material paste.

The raw material paste is extruded through a honeycomb die to form a honeycomb structural body having approximately 300 cpsi (approximately 46.5 cell/cm$^2$) with a partition thickness of approximately 0.010 inch (approximately 0.25 mm). Accordingly, a body with a diameter of 143.8 mm and a length of 150 mm is obtained.

Then, the body is dried for 20 minutes using both microwave (2.45 GHz, 20 kW) and hot air (140° C., air speed of 1 m/s).

Next, using the same raw material paste as that for a honeycomb body, sealant slurry is prepared.

Masking film is placed on both end surfaces of the dried body. Then, holes are formed in the masking films to make a checkered pattern so that the ceramic honeycomb structural body obtained after sintering is sealed in checkered patterns which are complementary on one end surface and on the other end surface of the ceramic body. Accordingly, a masked body is formed. As for masking film, a tape with an adhesive layer (adhesive force of 5.3 N/cm) made by forming acrylic adhesive on a polyester base is used.

The portion from an end sealed with masking film to a point 5 mm upward in a longitudinal direction of a dried body is immersed into sealant slurry. Then, the body is lifted from the sealant slurry. In the same manner, the other end of the body in a longitudinal direction is also immersed into the sealant slurry and lifted from the sealant slurry to obtain a sealed body.

Figure 7:
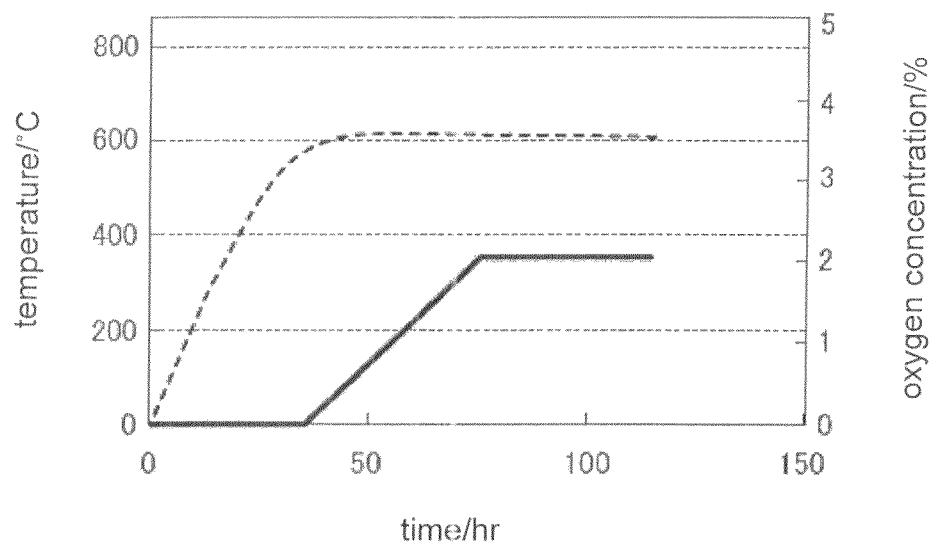
FIG. 7 is a chart showing oxygen concentration levels and surface temperatures of a body in an atmosphere during a degreasing step in example 1 of the present invention.

As shown in FIG. 7, a sealed body is heated for approximately 40 hours until its surface temperature reaches approximately 600° C. (programmed rate of temperature rise on the surface temperature of a body: approximately 15° C./h) by maintaining the oxygen concentration in an atmosphere at or below 0.2%. Then, the body is intermittently heated to maintain its surface temperature at approximately 600° C. while oxygen is supplied for approximately 40 hours so that the oxygen concentration in the atmosphere increases from 0.2% to 2% at a substantially constant rate. Then, the body is further heated for approximately 40 hours to degrease organic ingredients in the body while the oxygen concentration in the atmosphere is maintained at 2%.

The degreased body is sintered in atmospheric air at 1450° C. for four hours to obtain a ceramic honeycomb structural body.

In FIG. 7, the dotted line indicates chronological changes of surface temperature (° C.) of a body during a degreasing step, and the straight line indicates chronological changes of oxygen concentration (%) in a degreasing furnace.

Example 2

Seventy parts by mass of α-silicon carbide powder with a mean volume particle diameter of 20 μm (brand name YB-600, Yakushima Denko Co., Ltd.), 30 parts by weight of α-silicon carbide powder with a mean volume particle diameter of 0.5 μm (brand name GC-15, Yakushima Denko Co., Ltd.), 20 parts by weight of methyl cellulose (brand name METOLOSE 60SH, Shin-Etsu Chemical Co., Ltd.), 12 parts by weight of a lubricant (brand name Unilub, NOF Corporation), 5 parts by weight of plasticizer (brand name DG (Dynamite Glycerine), NOF Corporation), and 65 parts by weight of water are placed into a kneader (brand name Mix Muller, Shinto Kogyo K.K.) and kneaded to prepare raw material paste.

The same as in Example 1, the raw material paste is shaped into a body with a diameter of 143.8 mm and a length of 150 mm, which is then dried the same as in Example 1.

Then, sealant slurry is prepared by using the same raw material paste as that for a honeycomb body, and the body is sealed the same as in Example 1.

A sealed body is heated for approximately 40 hours until its surface temperature reaches approximately 600° C. (programmed rate of temperature rise on the surface of a body: approximately 15° C./h) while the oxygen concentration in an atmosphere is maintained at or below 0.2%. Then, the body is intermittently heated to maintain its surface temperature at approximately 600° C. while oxygen is supplied for approximately 40 hours so that the oxygen concentration in the atmosphere increases from 0.2% to 2% at a substantially constant rate. Then, the body is further heated for approximately 40 hours to degrease organic ingredients in the body while the oxygen concentration in the atmosphere is maintained at 2%.

The degreased body is sintered for 3 hours at 2200° C. in an inactive atmosphere to obtain a ceramic honeycomb structural body.

Comparative Example 1

The same as in Example 1, raw material paste is prepared and shaped to obtain a body with a diameter of 143.8 mm and a length of 150 mm. Then, the body is dried the same as in Example 1.

Then, the body is sealed the same as in Example 1.

The sealed body is degreased for approximately 120 hours while the oxygen concentration in an atmosphere is maintained at approximately 3%, and the heater is turned on and off for feedback control by setting the desired temperature on the surface of the body at 600° C. Then, the body is sintered for 4 hours at 1450° C. to obtain a ceramic honeycomb structural body.

Comparative Example 2

The same as in Comparative Example 1, raw material paste is prepared and shaped to obtain a body and cut to a desired length. The body cut to size is then dried and sealed.

The sealed body is degreased for approximately 280 hours until its surface temperature reaches approximately 600° C. (programmed rate of temperature rise on the surface of a body: approximately 2° C./h), while the oxygen concentration in an atmosphere is maintained at approximately 3%. Then, the body is sintered the same as in Comparative Example 1 to obtain a ceramic honeycomb structural body.

Evaluation

Ceramic bodies obtained in Examples 1 and 2 and Comparative Example 1 are checked using a scanning electron microscope (EMAX Energy EX-250, Horiba, Ltd.) to evaluate how often cracking has occurred, and also observed visually to see whether deformation has occurred.

As a result, it is found that ceramic bodies obtained in Examples 1 and 2 are less likely to have cracking than a ceramic body obtained in Comparative Example 1. It is also found that ceramic bodies obtained in Examples 1 and 2 are less likely to be deformed than a ceramic body obtained in Comparative Example 1. In addition, temperature is easier to control for degreasing steps in Examples 1 and 2 than in Comparative Example 1.

The duration for a degreasing step in Examples 1 and 2 is reduced compared with the duration in Comparative Example 2.

If the duration for a degreasing step (total time for the first and second steps) in Examples 1 and 2 is changed to approximately 5 hours, the same results are achieved as those in Examples 1 and 2.

Obviously, numerous modifications and variations of the present invention are possible in light of the above teachings. It is therefore to be understood that within the scope of the appended claims, the invention may be practiced otherwise than as specifically described herein.

What is claimed is:

1. A method for manufacturing a ceramic honeycomb structure, comprising:
    kneading inorganic particles and a binder ingredient such that a raw material paste comprising the inorganic particles and the binder ingredient is prepared;
    forming a body comprising the raw material paste and having a honeycomb structure such that the body has the honeycomb structure having a plurality of through-holes extending in a longitudinal direction of the body and a plurality of partition portions formed between the through-holes;
    degreasing the body comprising heating the body comprising the raw material paste in an atmosphere maintaining an oxygen concentration of 0.2% or less in a first heating and heating the body comprising the raw material paste in an atmosphere having an oxygen concentration which is higher than the oxygen concentration of the first heating in a second heating such that a degreased body having the honeycomb structure is formed; and
    sintering the degreased body having the honeycomb structure at a temperature in a range of 1350° C. to 1650° C. such that a ceramic body having the honeycomb structure is formed,
    wherein the degreasing comprises maintaining a surface temperature of the body in a range of 400° C. to 600° C. in the first heating and the second heating.

2. The method for manufacturing a ceramic honeycomb structure according to claim 1, wherein the body is heated in the first heating such that a surface temperature of the body reaches a temperature in a range of 450° C.~600° C.

3. The method for manufacturing a ceramic honeycomb structure according to claim 2, wherein the first heating of the body includes setting a programmed rate of temperature rise on a surface of the body in a range of 10° C./h~20° C./h.

4. The method for manufacturing a ceramic honeycomb structure according to claim 2, wherein the body is heated in the first heating such that an organic ingredient in the body is substantially thermally decomposed.

5. The method for manufacturing a ceramic honeycomb structure according to claim 2, wherein the second heating of the body includes maintaining a surface temperature of the body in a range of 450° C.~600° C.

6. The method for manufacturing a ceramic honeycomb structure according to claim 2, wherein the degreasing of the body includes placing the body comprising the raw material paste in a degreasing furnace and raising the oxygen concentration in the degreasing furnace to a range of 1%~5% in 0.1~50 hours in the second heating.

7. The method for manufacturing a ceramic honeycomb structure according to claim 2, wherein the second heating comprises heating the body comprising the raw material paste in the atmosphere having the oxygen concentration which is higher than the oxygen concentration of the first heating such that an organic ingredient in the body is substantially oxidized.

8. The method for manufacturing a ceramic honeycomb structure according to claim 2, further comprising drying the body comprising the raw material paste and having the honeycomb structure.

9. The method for manufacturing a ceramic honeycomb structure according to claim 1, wherein the first heating of the body includes setting a programmed rate of temperature rise on a surface of the body in a range of 10° C./h~20° C./h.

10. The method for manufacturing a ceramic honeycomb structure according to claim 1, wherein the body is heated in the first heating such that an organic ingredient in the body is substantially thermally decomposed.

11. The method for manufacturing a ceramic honeycomb structure according to claim 1, wherein the second heating of the body includes maintaining a surface temperature of the body in a range of 450° C.~600° C.

12. The method for manufacturing a ceramic honeycomb structure according to claim 1, wherein the degreasing of the body includes placing the body comprising the raw material paste in a degreasing furnace and raising the oxygen concentration in the degreasing furnace to a range of 1%~5% in 0.1~50 hours in the second heating.

13. The method for manufacturing a ceramic honeycomb structure according to claim 1, wherein the second heating comprises heating the body comprising the raw material paste in the atmosphere having the oxygen concentration which is higher than the oxygen concentration of the first heating such that an organic ingredient in the body is substantially oxidized.

14. The method for manufacturing a ceramic honeycomb structure according to claim 1, further comprising drying the body comprising the raw material paste and having the honeycomb structure.

15. The method for manufacturing a ceramic honeycomb structure according to claim 1, further comprising applying a sealant to one end of each of the through-holes of the body in the longitudinal direction such that each of the through-holes of the body is sealed at the one end.

16. The method for manufacturing a ceramic honeycomb structure according to claim 1, wherein the inorganic particles are at least one inorganic particle material selected from the group consisting of silicon carbide particles, titania particles and alumina particles.

17. The method for manufacturing a ceramic honeycomb structure according to claim 1, further comprising forming a precursor comprising particles comprising the inorganic particles, wherein the kneading comprises kneading the binder ingredient and the particles of the precursor comprising the inorganic particles, and the inorganic particles are titania particles and alumina particles.

18. The method for manufacturing a ceramic honeycomb structure according to claim 17, wherein the forming of the precursor comprises spray-drying the alumina particles onto the titania particles.

19. The method for manufacturing a ceramic honeycomb structure according to claim 1, wherein the body is heated in the first heating such that a first organic ingredient in the body is substantially thermally decomposed, and the second heating comprises heating the body comprising the raw material paste in the atmosphere having the oxygen concentration which is higher than the oxygen concentration of the first heating such that a second organic ingredient in the body is substantially oxidized.

* * * * *